US011287142B2

(12) United States Patent
Deka (10) Patent No.: US 11,287,142 B2
(45) Date of Patent: Mar. 29, 2022

(54) HIGH TEMPERATURE SUPER INSULATED CAVITY FOR COOKING APPLICATIONS

(71) Applicant: WHIRLPOOL CORPORATION, Benton Harbor, MI (US)

(72) Inventor: Lakshya J. Deka, Mishawaka, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 54 days.

(21) Appl. No.: 16/313,849

(22) PCT Filed: Oct. 4, 2016

(86) PCT No.: PCT/US2016/055321
§ 371 (c)(1),
(2) Date: Dec. 27, 2018

(87) PCT Pub. No.: WO2018/067125
PCT Pub. Date: Apr. 12, 2018

(65) Prior Publication Data
US 2019/0154269 A1    May 23, 2019

(51) Int. Cl.
*F24C 15/34* (2006.01)
*F24C 15/08* (2006.01)
*B23K 101/04* (2006.01)

(52) U.S. Cl.
CPC .............. *F24C 15/34* (2013.01); *F24C 15/08* (2013.01); *B23K 2101/045* (2018.08)

(58) Field of Classification Search
CPC .......... F24C 15/08; F24C 15/34; F16L 59/065
USPC ............................................... 126/1 F, 273 R
See application file for complete search history.

(56) References Cited

U.S. PATENT DOCUMENTS

| 3,994,275 | A | * | 11/1976 | Williams | F24B 1/1957 |
| | | | | | 126/552 |
| 6,038,830 | A | * | 3/2000 | Hirath | F16L 59/065 |
| | | | | | 52/788.1 |
| 6,109,712 | A | * | 8/2000 | Haworth | F24C 15/34 |
| | | | | | 312/400 |
| 6,408,841 | B1 | | 6/2002 | Hirath et al. | |
| 6,488,172 | B1 | | 12/2002 | Wenning et al. | |
| 2007/0108180 | A1 | * | 5/2007 | Francis | F24C 15/34 |
| | | | | | 219/400 |
| 2008/0156788 | A1 | * | 7/2008 | Hubbs | F24C 15/34 |
| | | | | | 219/405 |
| 2012/0017883 | A1 | * | 1/2012 | Campen | F24C 15/34 |
| | | | | | 126/19 R |
| 2013/0256319 | A1 | * | 10/2013 | Kuehl | F25B 39/00 |
| | | | | | 220/592.09 |
| 2015/0377494 | A1 | | 12/2015 | Choudhary et al. | |

FOREIGN PATENT DOCUMENTS

| EP | 0270984 A2 | 6/1988 | |
| EP | 1541930 A1 | 8/2004 | |
| EP | 2275746 A2 | 7/2010 | |
| WO | 2015032511 A1 | 3/2015 | |
| WO | WO-2017091761 A1 * | 6/2017 | ............. B65D 81/30 |

* cited by examiner

*Primary Examiner* — Avinash A Savani
(74) *Attorney, Agent, or Firm* — Price Heneveld LLP (57) ABSTRACT

A vacuum insulated oven cabinet includes a cavity body having an exterior surface. An insulation structure having one or more vacuum insulated panels may have the insulation structure welded to the exterior surface of the cavity body. The one or more vacuum insulated panels may have a hermetically sealed envelope encasing a vacuum core material.

20 Claims, 6 Drawing Sheets

HIGH TEMPERATURE SUPER INSULATED CAVITY FOR COOKING APPLICATIONS

CROSS-REFERENCE TO RELATED APPLICATION

This application claims priority to International Application No. PCT/US2016/055321, filed on Oct. 4, 2016, entitled "HIGH TEMPERATURE SUPER INSULATED CAVITY FOR COOKING APPLICATIONS," the disclosure of which is hereby incorporated herein by reference in its entirety.

FIELD OF THE DISCLOSURE

The present disclosure generally relates to insulated structures, and in particular, to a vacuum insulated cabinet used for cooking applications.

BACKGROUND OF THE DISCLOSURE

Cooking appliances, such as microwaves and gas or electric ranges, may account for a significant percentage of total residential energy usage. Technological advances in thermally insulating materials used in cooking applications have shown incremental gains throughout the years to improve an appliance's energy optimization. Both refrigeration and cooking cabinets have recently started implementing vacuum insulation panels (VIPs) to improve thermal insulation of their respective insulated cabinets. Thanks to advances in the last two decades in barrier films, core materials, and manufacturing technologies, VIP technology is slowly becoming a commercially viable solution for improving the energy efficiency of appliance cabinets, even though there are still many problems that must be addressed in order for the insulation technology to reach its fullest potential in the appliance market.

SUMMARY

According to one aspect of the present disclosure, a vacuum insulated oven cabinet has a cavity body having an exterior surface; an insulation structure having one or more vacuum insulated panels wherein the insulation structure is welded to the exterior surface of the cavity body; and wherein the one or more vacuum insulated panels has a hermetically sealed envelope to encase a vacuum core material.

According to another aspect of the present disclosure, a method of forming a vacuum insulated cabinet structure includes forming a cavity body having an exterior surface; forming an insulation structure having an outer surface and one or more vacuum insulated panels; forming the outer surface from a metallic envelope to make the one or more vacuum insulated panels; and welding the insulation structure to the cavity body.

According to another aspect of the present disclosure, a vacuum insulated cabinet structure has a cavity body having an exterior surface; an insulation structure having an outer surface where the insulation structure is welded to the exterior surface of the cavity body; and a metallic envelope used to form the one or more vacuum insulated panels that forms the outer surface of the insulation structure. The insulation structure has one or more vacuum insulated panels.

These and other features, advantages, and objects of the present device and method will be further understood and appreciated by those skilled in the art upon studying the following specification, claims, and appended drawings.

DETAILED DESCRIPTION OF EMBODIMENTS

Reference will now be made in detail to the present embodiments, examples of which are illustrated in the accompanying drawings. Whenever possible, the same reference numerals will be used throughout the drawings to refer to the same or like parts.

Figure 1:
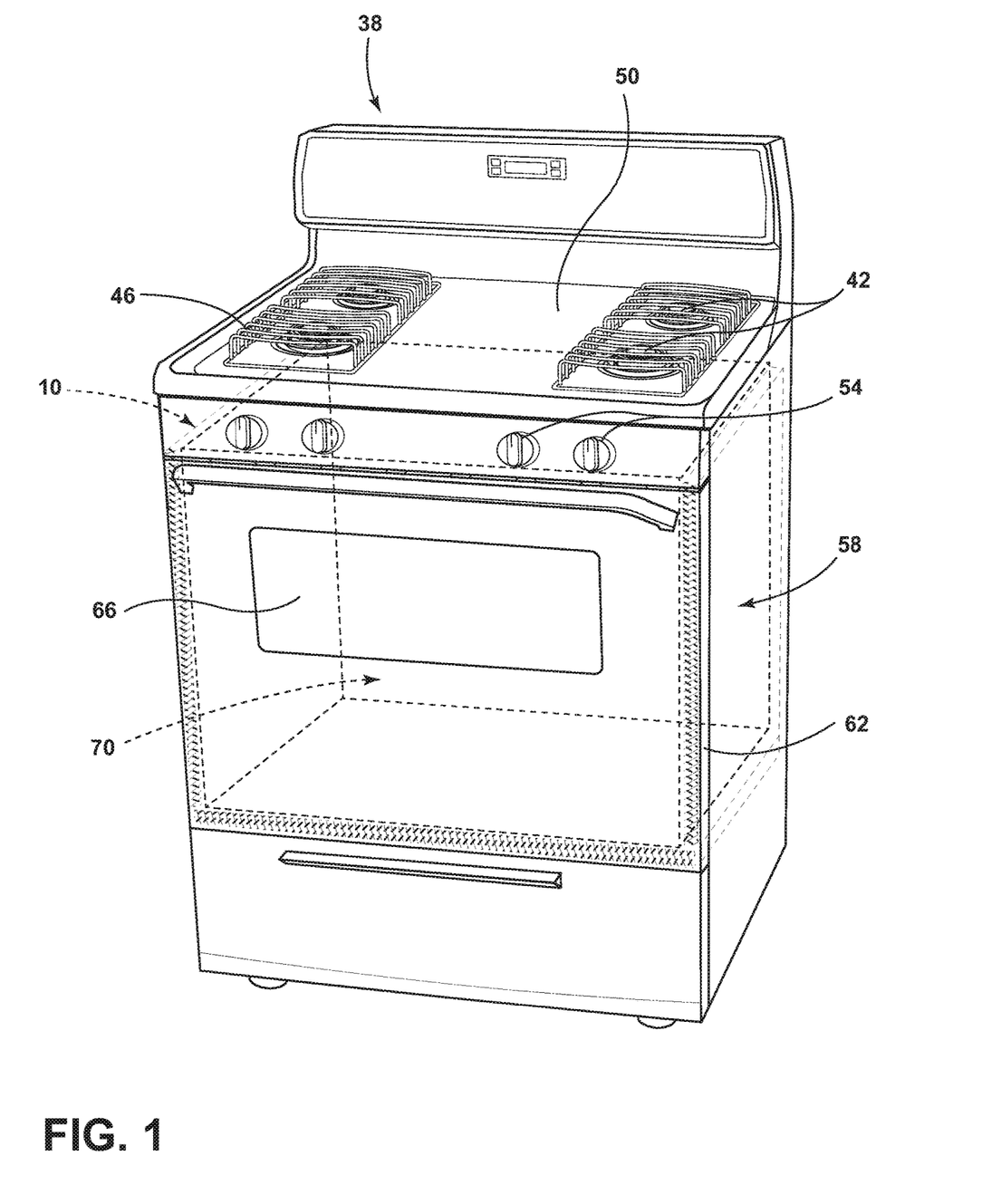
FIG. 1 is a front perspective view of a gas range.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-6B, reference numeral 10 generally designates a vacuum insulated oven cabinet. The vacuum insulated oven cabinet 10 includes a cavity body 14 having an exterior surface 18. An insulation structure 22 having one or more vacuum insulated panels 26 may have the insulation structure 22 welded to the exterior surface 18 of the cavity body 14. The one or more vacuum insulated panels 26 have a hermetically sealed envelope 30 encasing a vacuum core material 34.

Referring now to FIG. 1, a cooking range 38 includes a burner 42 and a burner grate 46 positioned on a cooktop 50. The cooking range 38 may include one or more burner dials 54 used to control the temperature of both the burners 42 and/or an oven 58. The oven 58 includes an oven door 62 having an insulated oven window 66. Additionally, the oven 58 internally has the vacuum insulated oven cabinet 10 formed by the cavity body 14 (FIG. 2) inside the cooking range 38. The cooking appliance shown in FIG. 1 is the cooking range 38, but it will be understood that this disclosure may equally be applied to microwaves, commercial ovens, and the like, without departing from the teachings provided herein.

Figure 2:
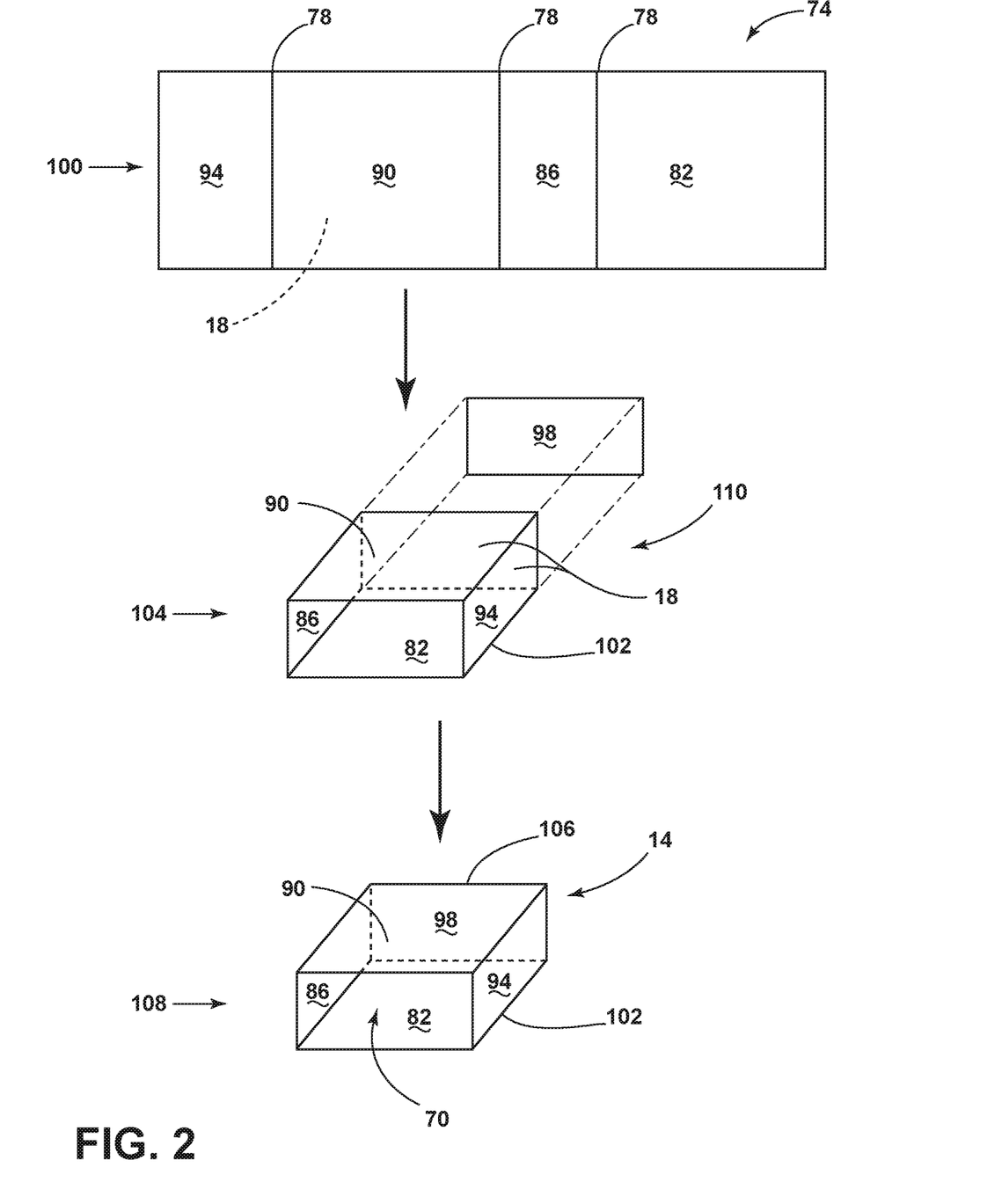
FIG. 2 illustrates the production of a cavity body using a metal sheet according to one aspect of the current disclosure.

With reference to FIG. 2, a method for forming the cavity body 14 is illustrated. First (step 100), a metal sheet 74 is punched to form one or more crimp lines 78 to form sections corresponding to a bottom cavity wall 82, a left cavity wall 86, a top cavity wall 90, and a right cavity wall 94. Next (step 104), the metal sheet 74 is folded along each of the crimp lines 78 to form a four sided cavity frame 110 that has a corner weld seam 102 to connect the right cavity wall 94 to the bottom cavity wall 82. In some embodiments, the cavity frame 110 does not have a rear cavity wall 98 included as a section on the metal sheet 74 so the rear cavity wall 98 is welded to the cavity frame 110 to form a rear weld seam 106 (step 108). As shown in step 108, once the rear cavity wall 98 is coupled to the cavity frame 110, the cavity body 14 is fully assembled. In some embodiments, the metal sheet 74 may have an additional section attached (not shown) along an additional crimp line 78 to form the rear cavity wall 98 coupled on at least one side to another cavity wall section. In other embodiments, the cavity walls 82-98 may be coupled by stamping or crimping the edges of the walls as an alternative to welding.

The metal sheet 74 may be formed using any metal or metal alloy known in the art and is not meant to be limiting. In some embodiments, the interior surface of the metal sheet 74 may be enameled and/or additionally stamped to include additional features on the cavity body 14 inside the oven cavity 70.

With reference to FIGS. 3A-6B, the insulation structure 22 may be alternatively made using a variety of different structures as shown in the different embodiments described herein. One of the similarities found in each of the embodiments detailing the various insulation structures 22 is the use of the hermetically sealed envelope 30. In some embodiments, the hermetically sealed envelope 30 is made from a group of materials including metals, metal alloys, metal foils, or other thin metal materials that are flexible and can maintain a hermetic seal to maintain the vacuum in the respective vacuum insulated panels 26. The metal hermetically sealed envelope 30 of the insulation structure 22 may be soldered or welded to the cavity body 14 to maintain the respective positioning of the insulation structure 22 and cavity body 14 within the vacuum insulated oven cabinet 10. In the embodiments disclosed herein, the insulation structure 22 may be a side paneled insulation structure 116, a one-piece vacuum insulated panel 142, a cavitied insulation wrapper 148, and an insulation wrapper 164. In some embodiments, the cavity body 14 has five walls where each of the five walls is coupled to at least one vacuum insulated panel 26 of the insulated structure 22.

Figure 3A:
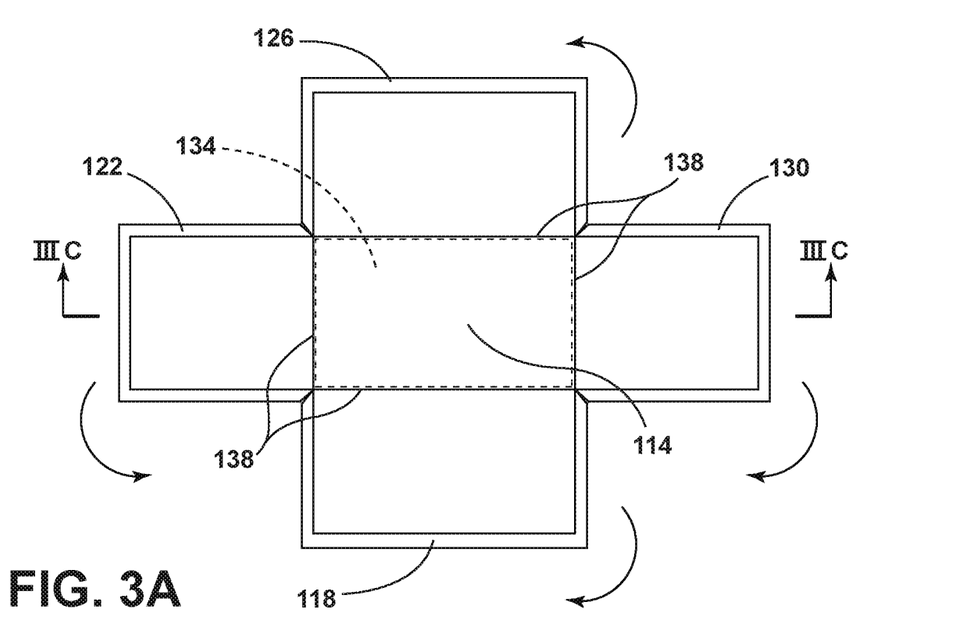
FIG. 3A is a bottom view of an unfolded side paneled insulation structure according to one aspect of the current disclosure.
Figure 3B:
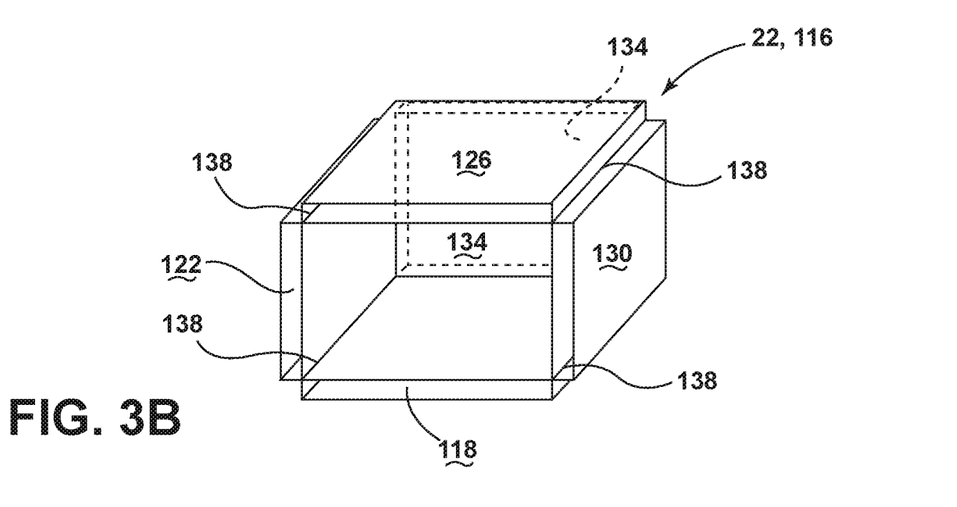
FIG. 3B is a perspective view of the folded insulation structure made from the unfolded side paneled insulation structure shown in FIG. 3A.
Figure 3C:
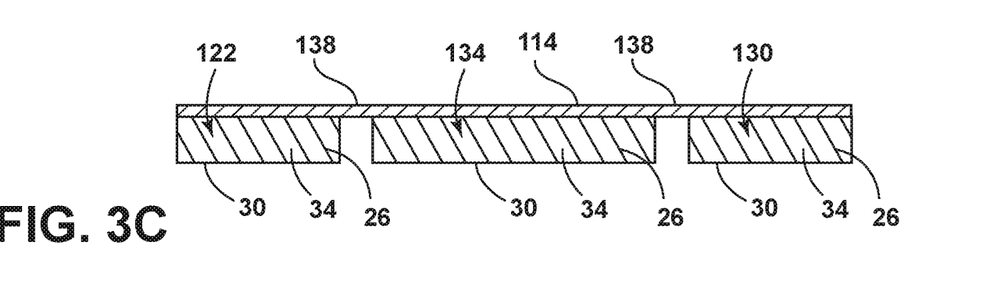
FIG. 3C is a cross-sectional view of the unfolded insulation structure taken along the line IIIC-IIIC shown in FIG. 3A.

With reference to FIGS. 3A-3C, in some embodiments the insulation structure 22 may be the side paneled insulation structure 116 which can be made from a foldable metal sheet 114 coupled to one or more vacuum insulated panels 26. As shown in FIGS. 3A-3C, the foldable metal sheet 114 is coupled to a bottom vacuum insulated panel 118, a left vacuum insulated panel 122, a top vacuum insulated panel 126, a right vacuum insulated panel 130, and a rear vacuum insulated panel 134. Each of the vacuum insulated panels (118, 122, 126, 130, 134) are separated by a fold line 138 positioned on the foldable metal sheet 114. The foldable metal sheet 114 coupled to the five vacuum insulated panels 118, 122, 126, 130, 134 are folded along each of the fold lines 138 to form a side paneled insulation structure 116 as the insulation structure 22. FIG. 3C shows the cross-section of the left vacuum insulated panel 122, the rear vacuum insulated panel 134, and the right vacuum insulated panel 130 all coupled through the foldable metal sheet 114. The cross-section of each of these vacuum insulated panels 122, 134, 130 shows the foldable metal sheet 114 coupled to the respective vacuum insulated panel 26. Each of the vacuum insulated panels 26 contain the vacuum core material 34 enclosed by the hermetically sealed outer envelope 30. The vacuum core material 34 may be glass fiber, aerogel, fumed silica, precipitated silica, rice husk ash, perlite, glass microspheres, cenosphere, glass wool, mineral wool, and combinations thereof. In some embodiments, the insulation structure 22 is a side paneled insulation structure 116 formed from a foldable metal sheet 114 coupled to one or more vacuum insulated panels 26 where the one or more vacuum insulated panels 26 may be folded to form the side paneled insulation structure 116.

In some embodiments, the foldable metal sheet 114 may be made from a variety of metal materials including metals, metal alloys, metal foils, or other thin metal materials that are flexible and can be coupled to maintain a hermetic seal to maintain the vacuum in the respective vacuum insulated panels 26. The side paneled insulation structure 116 may be soldered or welded to the cavity body 14 to maintain the respective positioning of the insulation structure 22 and cavity body 14 within the vacuum insulated oven cabinet 10.

The vacuum insulated oven cabinets 10 disclosed herein provide several advantages. For example, the use of vacuum insulated panels 26 to form the insulation structure 22 surrounding the cavity body 14 requires less space than the insulation traditionally used to insulate oven cavities. The traditional fiberglass insulation frequently used in the art typically has a thickness of 1 inch to 1.5 inches while vacuum insulated panels may take up half that space. With less internal space needed for insulation, the cavity body 14 may be made bigger with a larger volume for cooking space.

The use of vacuum insulated panels 26 as disclosed herein may reduce the thickness the required insulation by up to 75%, up to 70%, up to 65%, up to 60%, up to 55%, up to 50%, up to 45%, up to 40%, up to 35%, up to 30%, or up to 25%. In some embodiments, the use of vacuum insulated panels 26 to form the insulation structure 22 surrounding the cavity body 14 may have a thickness from 0.25 inches to 0.75 inches, from 0.25 inches to 0.50 inches, or have a thickness of about 0.25 inches, about 0.30 inches, about 0.35 inches, about 0.40 inches, about 0.45 inches, about 0.50 inches, about 0.55 inches, about 0.60 inches, about 0.65 inches, about 0.70 inches, or about 0.75 inches. By reducing the thickness required to insulate the oven cabinet, the cavity body 14 may have both an increased width and an increased height by about 0.50 inches to 1.50 inches, 0.50 inches to 1.0 inches, or by about about 0.50 inches, about 0.55 inches, about 0.60 inches, about 0.65 inches, about 0.70 inches, or about 0.75 inches, about 0.80 inches, about 0.85 inches, about 0.90 inches, about 0.95 inches, about 1.0 inch.

Figure 4:
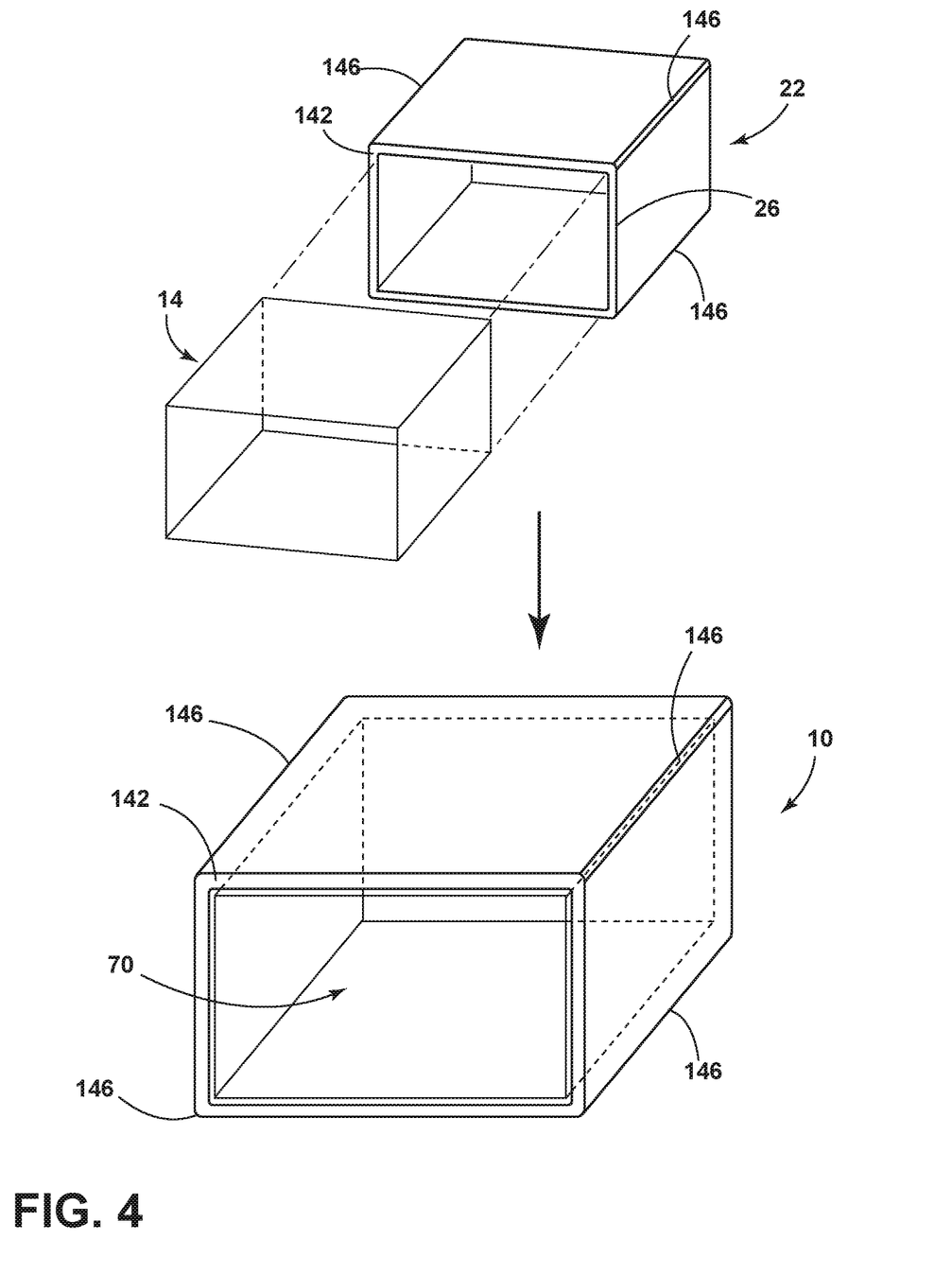
FIG. 4 is a perspective view of the cavity body being positioned in a one-piece vacuum insulated panel insulation structure according to one aspect of the present disclosure.

With reference to FIG. 4, in some embodiments the insulation structure 22 may be the one-piece vacuum insulation panel 142 where the one-piece vacuum insulated panel 142 has at least one flexible joint 146. The cavity body 14 may be positioned within the one piece vacuum insulated panel 142 and the one-piece vacuum insulated panel 142 may be soldered to the cavity body 14. The one-piece vacuum insulated panel 142 may be made from a variety of metal materials including metals, metal alloys, metal foils, or other thin metal materials that are flexible and can be used to maintain a hermetic seal to maintain the vacuum in the one-piece vacuum insulated panel 142. In some embodiments, the insulation structure 22 is a one-piece vacuum insulated panel 142 having one or more flexible joints 146 that surround the exterior surface 18 or walls 82, 86, 90, 94, 98 (FIG. 2) of the cavity body 14.

Figure 5A:
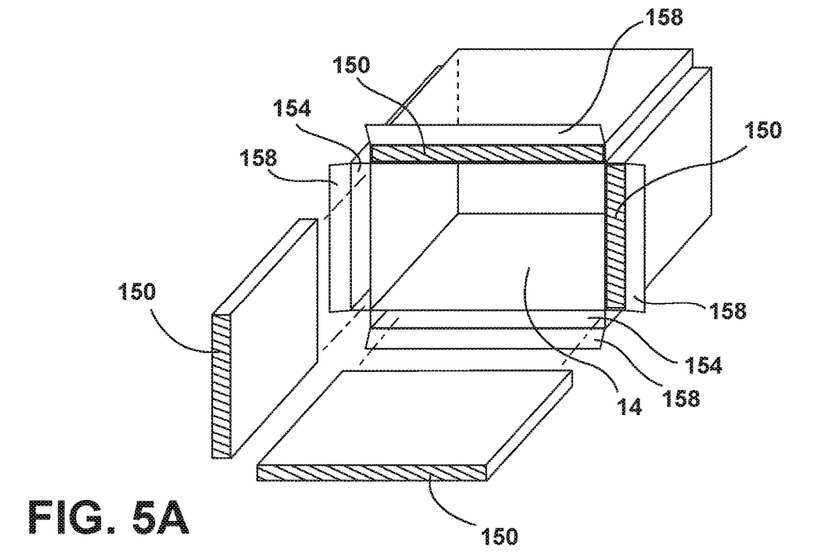
FIG. 5A is a perspective view of an insulation structure having an insulation panel being positioned inside a vacuum insulated panel cavity.
Figures 5B, 5C:
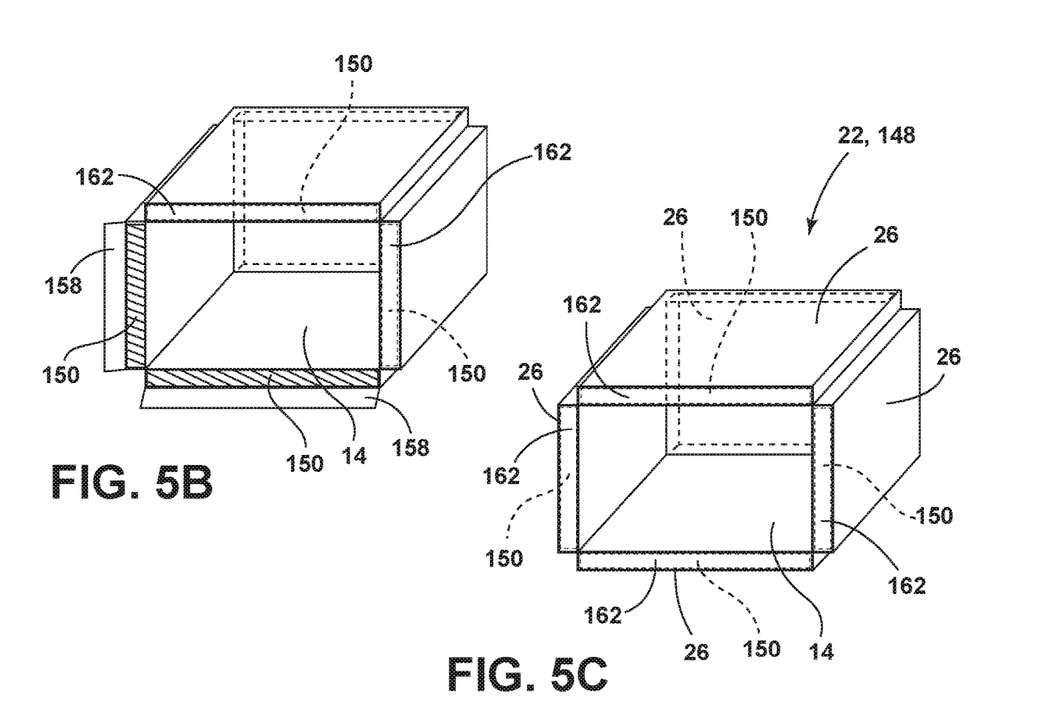
FIG. 5B is a perspective view of the insulation structure having the insulation panel welded and vacuum sealed into the vacuum insulated panel cavity of the insulation structure according to one aspect of the present disclosure.
FIG. 5C is a perspective view of the cavitied insulation wrapper according to one aspect of the present disclosure.

Referring now to FIGS. 5A-5C, in some embodiments the insulation structure 22 may be made from the cavitied insulation wrapper 148 having one or more pocket cavities 154 coupled to each wall of the cavity body 14. Each pocket cavity 154 has an outwardly extending flange 158 that may be soldered to close the pocket cavity 154 under vacuum to vacuum seal in an insulation panel 150 or the vacuum core material 34 (FIG. 3C). The insulation panel 150 and/or the vacuum core material 34 may be selected from the group consisting of glass fiber, aerogel, fumed silica, precipitated silica, rice husk ash, perlite, glass microspheres, cenosphere, glass wool, mineral wool, and combinations thereof. Each outwardly extending flange 158 may be soldered around the insulation panel 150 as a vacuum is applied to form each of the final vacuum insulated panels 26, 162. In some embodiments, the cavity body 14 has one or more pocket cavities 154 coupled to the exterior surface 18 to receive an insulation panel 150 or vacuum core material 34 and wherein the pocket cavity 154 has an outwardly extending flange 158 used to weld in and evacuate the insulation panel 150 or vacuum core material 34 to form the one or more vacuum insulated panels 26 in the pocket cavities 154.

Figure 6A:
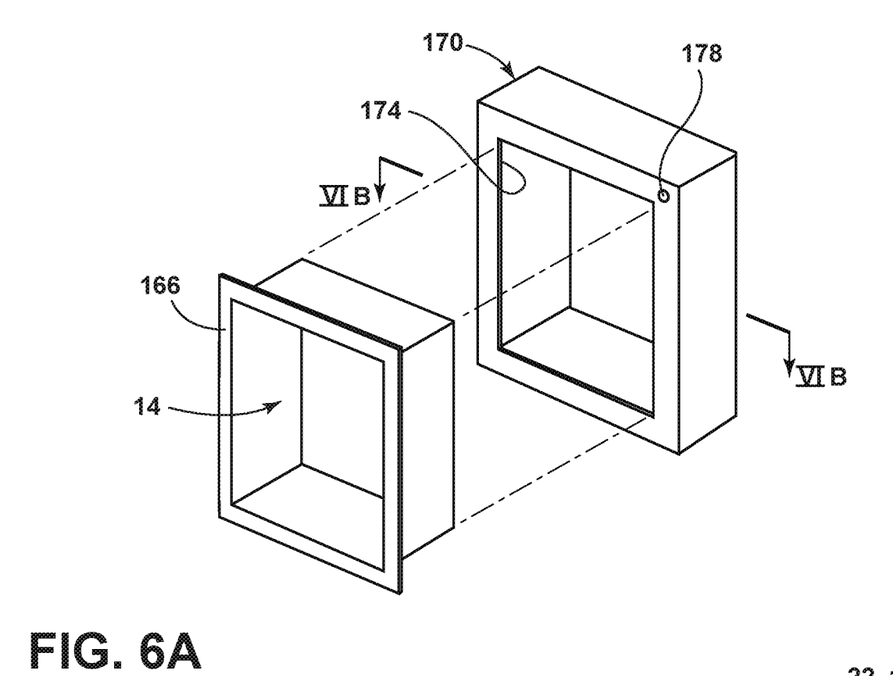
FIG. 6A is an exploded perspective view of an insulation structure according to one aspect of the current disclosure.
Figure 6B:
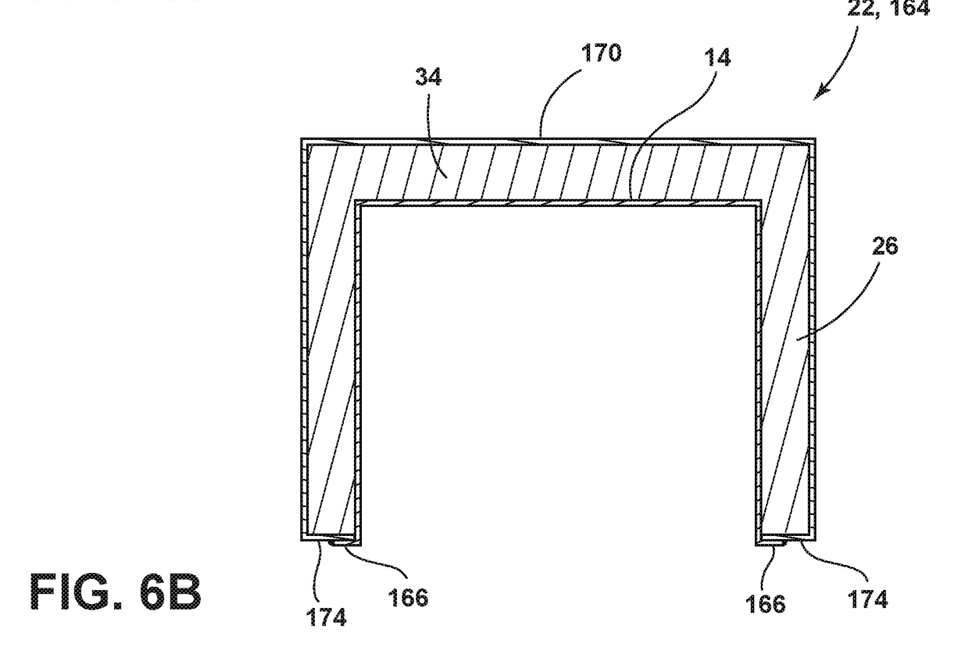
FIG. 6B is a cross-sectional view of the insulation structure taken along the line VIB-VIB shown in FIG. 6A.

Referring now to FIGS. 6A-6B, in some embodiments the insulation structure 22 may be made by using the cavity body 14 to form part of the vacuum insulated panel 26. For example, the cavity body 14 may have a cavity flange 166 where the cavity body 14 is inserted into an oven wrapper 170 having an oven flange 174. The cavity flange 166 may be welded to the oven flange 174 to form a hermetic seal where the vacuum core material 34 may be added through a fill hole 178 as a vacuum is applied to form the single vacuum insulated panel 26 around the cavity body 14. In some embodiments, a trim breaker strip (not shown) may be used to attach the cavity body 14 to the wrapper 170 of the oven 58 (FIG. 1) if no cavity flange 166 or oven flange 174 is used. In some embodiments, the oven wrapper 170 and oven flange 174 may be made from a variety of metal materials including metals, metal alloys, metal foils, or other thin metal materials that are flexible and can be used to maintain a hermetic seal to maintain the vacuum in the vacuum insulated panel 26 made by the cavity body 14 and oven wrapper 170. In some embodiments, the cavity body 14 has a cavity flange 166 and the cavity body 14 is inserted into an oven wrapper 170 having an oven flange 174 wherein the cavity flange 166 contacts the oven flange 174 and the cavity flange 166 is welded to the oven flange 174 and the vacuum core material 34 is added under a vacuum to form the vacuum insulated panel 26.

It will be understood by one having ordinary skill in the art that construction of the described device and method and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is a vacuum insulated oven cabinet comprising: a cavity body having an exterior surface; an insulation structure having one or more vacuum insulated panels wherein the insulation structure is welded to the exterior surface of the cavity body; and wherein the one or more vacuum insulated panels comprise a hermetically sealed envelope encasing a vacuum core material.

The vacuum insulated oven cabinet of Embodiment A wherein the cavity body has five walls where each of the five walls is coupled to at least one vacuum insulated panel of the insulated structure.

The vacuum insulated oven cabinet of Embodiment A or Embodiment A with any of the intervening features wherein the hermetically sealed envelope comprises a metal foil.

The vacuum insulated oven cabinet of Embodiment A or Embodiment A with any of the intervening features wherein the vacuum core material is selected from the group consisting of glass fiber, aerogel, fumed silica, precipitated silica, rice husk ash, perlite, glass microspheres, cenosphere, glass wool, mineral wool, and combinations thereof.

The vacuum insulated oven cabinet of Embodiment A or Embodiment A with any of the intervening features wherein the insulation structure is a side paneled insulation structure formed from a foldable metal sheet coupled to one or more vacuum insulated panels where the one or more vacuum insulated panels may be folded to form the side paneled insulation structure.

The vacuum insulated oven cabinet of Embodiment A or Embodiment A with any of the intervening features wherein the insulation structure is a one-piece vacuum insulated panel having one or more flexible joints that surround the exterior surface of the cavity body.

The vacuum insulated oven cabinet of Embodiment A or Embodiment A with any of the intervening features wherein the cavity body has one or more pocket cavities coupled to the exterior surface to receive an insulation panel or the vacuum core material and wherein the pocket cavity has an outwardly extending flange used to weld in and evacuate the insulation panel or the vacuum core material to form the one or more vacuum insulated panels in the pocket cavities.

The vacuum insulated oven cabinet of Embodiment A or Embodiment A with any of the intervening features wherein the cavity body has a cavity flange and the cavity body is inserted into an oven wrapper having an oven flange wherein the cavity flange contacts the oven flange and the cavity flange is welded to the oven flange and the vacuum core material is added under a vacuum to form the vacuum insulated panel.

Embodiment B is a method of forming a vacuum insulated cabinet structure, the method comprising: forming a cavity body having an exterior surface; forming an insulation structure having an outer surface and one or more vacuum insulated panels; forming the outer surface from a metallic envelope to make the one or more vacuum insulated panels; and welding the insulation structure to the cavity body.

The method of Embodiment B wherein the one or more vacuum insulated panels comprise a vacuum core material selected from the group consisting of glass fiber, aerogel, fumed silica, precipitated silica, rice husk ash, perlite, glass microspheres, cenosphere, glass wool, mineral wool, and combinations thereof.

The method of Embodiment B or Embodiment B with any of the intervening features wherein the cavity body has five walls where each of the five walls is coupled to at least one vacuum insulated panel of the insulated structure.

The method of Embodiment B or Embodiment B with any of the intervening features wherein the insulation structure is a side paneled insulation structure formed from a foldable metal sheet coupled to one or more vacuum insulated panels where the one or more vacuum insulated panels may be folded to form the side paneled insulation structure.

The method of Embodiment B or Embodiment B with any of the intervening features wherein the insulation structure is a one-piece vacuum insulated panel having one or more flexible joints that surround the exterior surface of the cavity body.

The method of Embodiment B or Embodiment B with any of the intervening features wherein the cavity body has one or more pocket cavities coupled to the exterior surface to receive an insulation panel or the vacuum core material and wherein the pocket cavity has an outwardly extending flange used to weld in and evacuate the insulation panel or the vacuum core material to form the one or more vacuum insulated panels in the pocket cavities.

The method of Embodiment B or Embodiment B with any of the intervening features wherein the cavity body has a cavity flange and the cavity body is inserted into an oven wrapper having an oven flange wherein the cavity flange contacts the oven flange and the cavity flange is welded to the oven flange and the vacuum core material is added under a vacuum.

Embodiment C is a vacuum insulated cabinet structure comprising: a cavity body having an exterior surface; an insulation structure having an outer surface wherein the insulation structure is welded to the exterior surface of the cavity body; and a metallic envelope used to form the one or more vacuum insulated panels that forms the outer surface of the insulation structure; wherein the insulation structure comprises one or more vacuum insulated panels.

The vacuum insulated cabinet structure of Embodiment C wherein the insulation structure is a side paneled insulation structure formed from a foldable metal sheet coupled to one or more vacuum insulated panels where the one or more vacuum insulated panels may be folded to form the side paneled insulated structure.

The vacuum insulated cabinet structure of Embodiment C or Embodiment C with any of the intervening features wherein the insulation structure is a one-piece vacuum insulated panel having one or more flexible joints that surround the exterior surface of the cavity body.

The vacuum insulated cabinet structure of Embodiment C or Embodiment C with any of the intervening features wherein the cavity body has one or more pocket cavities coupled to the exterior surface to receive an insulation panel or the vacuum core material and wherein the pocket cavity has an outwardly extending flange used to weld in and evacuate the insulation panel or the vacuum core material to form the one or more vacuum insulated panels in the pocket cavities.

The vacuum insulated cabinet structure of Embodiment C or Embodiment C with any of the intervening features wherein the cavity body has a cavity flange and the cavity body is inserted into an oven wrapper having an oven flange wherein the cavity flange contacts the oven flange and the cavity flange is welded to the oven flange and the vacuum core material is added under a vacuum to form the vacuum insulation panel.

What is claimed is:

1. A method of forming a vacuum insulated cabinet structure, the method comprising:
   forming a cavity body from metal and comprising a bottom wall, a top wall, a left wall, and a right wall at least partially defining an oven cavity, and wherein the bottom, top, right, and left walls define an exterior surface of the cavity body;
   forming a metal sheet into an insulation structure;
   forming multiple pocket cavities in the insulation structure, each of which is formed to receive at least one of a plurality of vacuum insulated panels, the vacuum insulated panels including a bottom vacuum insulated panel, a top vacuum insulated panel, a left vacuum insulated panel, and a right vacuum insulated panel, wherein each of the bottom, top, left, and right vacuum insulated panels comprise a hermetically sealed envelope encasing a vacuum core material;
   inserting a vacuum insulated panel into each of the multiple pocket cavities;
   coupling the metal sheet to the exterior surface of the cavity body such that the bottom, top, left, and right vacuum insulated panels are coupled with the respective bottom, top, left, and right walls by the metal sheet; and
   placing the cavity body and insulation structure inside an appliance outer shell.

2. The method of claim 1, wherein the vacuum core material is selected from the group consisting of glass fiber, aerogel, fumed silica, precipitated silica, rice husk ash, perlite, glass microspheres, cenosphere, glass wool, mineral wool, and combinations thereof.

3. The method of claim 1, wherein the step of forming a metal sheet into an insulation structure further comprises:
   folding the metal sheet along a fold line disposed between adjacent vacuum insulated panels.

4. A vacuum insulated cabinet structure comprising:
   an appliance outer shell;
   a cavity body, disposed inside the appliance outer shell, the cavity body made from metal and comprising a bottom wall, a top wall, a left wall, and a right wall at least partially defining an oven cavity, and wherein the bottom, top, right, and left walls define an exterior surface of the cavity body;
   an insulation structure comprising a metal sheet and defining multiple pocket cavities in the insulation structure, each of which is formed to slidably receive at least one of a plurality of vacuum insulated panels, the vacuum insulated panels including a bottom vacuum insulated panel, a top vacuum insulated panel, a left vacuum insulated panel, and a right vacuum insulated panel, wherein the metal sheet is attached to the exterior surface of the cavity body such that the bottom, left, top, and right vacuum insulated panels are coupled with the respective bottom, top, left, and right walls of the cavity body by the metal sheet;
   a flange disposed adjacent each of the multiple pocket cavities and configured to be hermetically sealed against each of the plurality of insulated panels; and
   wherein the bottom, top, left, and right vacuum insulated panels comprise a hermetically sealed envelope encasing a vacuum core material.

5. The vacuum insulated cabinet structure of claim 4, wherein the metal sheet comprises a fold line between each of the plurality of vacuum insulated panels.

6. The vacuum insulated cabinet structure of claim 4, wherein the hermetically sealed envelope comprises a metal, metal alloy, or metal foil.

7. The vacuum insulated cabinet structure of claim 4, wherein the vacuum core material is selected from the group consisting of glass fiber, aerogel, fumed silica, precipitated silica, rice husk ash, perlite, glass microspheres, cenosphere, glass wool, mineral wool, and combinations thereof.

8. The vacuum insulated cabinet structure of claim 4, wherein the cavity body further comprises a rear wall and wherein the insulation structure comprises a rear vacuum insulated panel attached to the rear wall of the cavity body.

9. The vacuum insulated cabinet structure of claim 4, wherein the at least one vacuum insulated panel is at least one of soldered and welded to the adjacent wall of the cavity body.

10. The vacuum insulated cabinet structure of claim 4, wherein the insulation structure comprises a single vacuum insulated panel having three flexible joints, and wherein a portion of the single vacuum insulated panel is in direct contact with the adjacent bottom, top, left, and right walls of the cavity body.

11. A vacuum insulated oven cabinet comprising:
    an appliance outer shell;
    a cavity body, disposed within the appliance outer shell, the cavity body made from metal and comprising a bottom wall, a top wall, a left wall, and a right wall at least partially defining an oven cavity, and wherein the bottom, top, right, and left walls define an exterior surface of the cavity body;
    an insulation structure formed from a pocket cavity coupled to the exterior surface of the cavity body along each of the bottom, top, right, and left walls, and a vacuum core material disposed within each of the pocket cavities, wherein each of the pocket cavities and the adjacent bottom, top, right, and left walls forms a vacuum insulated panel; and
    wherein each pocket cavity comprises a flange configured to fold inward, and wherein each flange is one of soldered and welded to the adjacent bottom, top, right, and left walls to seal the vacuum core material within the pocket cavity, and wherein each pocket cavity is configured to be evacuated under vacuum after the pocket cavity is sealed to form each vacuum insulated panel.

12. The method of claim 1, wherein the cavity body comprises a rear wall and wherein the insulation structure comprises a rear vacuum insulated panel, and wherein the step of coupling the metal sheet to the cavity body comprises:
    coupling each of the bottom, top, left, right, and rear walls of the cavity body to the adjacent bottom, top, left, right, and rear vacuum insulated panels of the insulation structure.

13. The method of claim 1, further comprising:
    at least one of soldering and welding the at least one vacuum insulated panel to the adjacent wall of the cavity body.

14. The method of claim 1, wherein the hermetically sealed envelope comprises a metal, metal alloy, or metal foil.

15. The method of claim 1, wherein the step of forming a cavity body comprises:
    forming crimp lines in a metal sheeting to form sections corresponding to the bottom wall, top wall, left wall, and right wall; and
    folding the metal sheet along each of the crimp lines to form the cavity body.

16. The vacuum insulated cabinet structure of claim 11, wherein the cavity body comprises a metal sheeting folded along crimp lines that form sections corresponding to the bottom wall, top wall, left wall, and right wall.

17. The vacuum insulated cabinet structure of claim 4, wherein the cavity body comprises a metal sheeting folded along crimp lines that form sections corresponding to the bottom wall, top wall, left wall, and right wall.

18. The vacuum insulated cabinet structure of claim 4, wherein the bottom vacuum insulated panel, top vacuum insulated panel, left vacuum insulated panel, and right vacuum insulated panel each have a thickness of from 0.25 inches to 0.75 inches.

19. The vacuum insulated oven cabinet of claim 11, wherein the cavity body further comprises a rear wall and the insulation structure comprises an additional pocket cavity coupled to the rear wall of the cavity body.

20. The vacuum insulated oven cabinet of claim 11, wherein the vacuum core material is selected from the group consisting of glass fiber, aerogel, fumed silica, precipitated silica, rice husk ash, perlite, glass microspheres, cenosphere, glass wool, mineral wool, and combinations thereof.

* * * * *